United States Patent Office 2,775,522
Patented Dec. 25, 1956

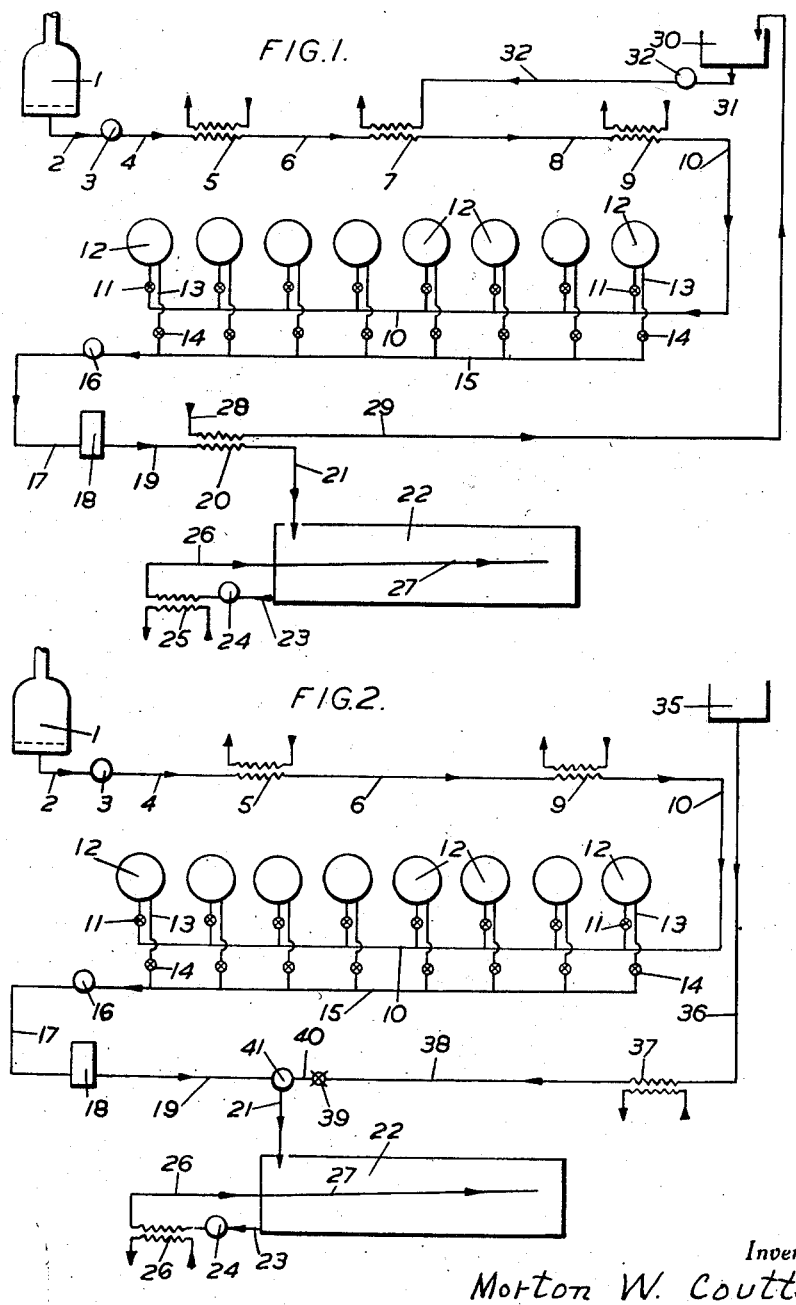

2,775,522

PROCESS FOR THE MANUFACTURE OF BEER AND THE LIKE

Morton William Coutts, Auckland, New Zealand, assignor to Dominion Breweries Limited, Auckland, New Zealand, a corporation of New Zealand Application August 6, 1952, Serial No. 302,964

Claims priority, application New Zealand September 28, 1951

6 Claims. (Cl. 99—52)

This invention relates to processes for the manufacture of beer and the like and has for its objects the provision of an improved process for the manufacture of a more perfectly matured and stabilised beer.

According to known processes beer is matured in storage vessels at cold temperatures after fermentation and this takes anything from three weeks to three months to complete properly and only then when perfect materials have been used.

It is been found that by chilling the wort before fermentation to a temperature which is just short of its freezing point and holding it at this temperature for a suitable period and then removing all material not in solution at this temperature, a substantially perfect stabilisation of the beer is achieved.

It is recognised that the practice of clarifying wort at yeast seeding temperatures which can be as low as 40 degrees F. and as high as 60 degrees F. has been done previously, but in this invention the important distinction presented is in reducing the temperature to just short of the freezing point of the wort which has preferably been adjusted to its optimum coagulating condition and holding it at this temperature until the wort has substantially stabilised and after which all material not in solution is removed from the wort at just above its freezing point, and to then reheat it to its seeding temperature.

The advantages obtained by this improved process are:

(a) A process which substantially stabilises the soluble protein and especially the flavour and head forming material which is normally depleted to a more or lesser degree while fermenting and maturing.

(b) The production of beer which does not alter in flavour or appearance for long periods, without the use of any chillproofing aids or the usual cold storage after fermentation.

(c) A process which allows 24 hours output of a brewhouse to be seeded with yeast into one fermenting vessel capable of holding this total output.

(d) A process which allows the use of mashing techniques which result in the maximum extraction of head and flavour forming material even if a proportion of it is of an unstable nature. This allows all available flavour and head forming material to be extracted and all the unstable material fractions are eliminated in the process herein described which allows only the stable soluble material fractions to go forward.

(e) The process allows more flexibility in the fermenting temperatures. Fermentation and storage can be carried out at the optimum temperature for fermentation and yeast sedimentation. The limitations of temperature which had to be observed in normal beers to remove cold sensitive material can be disregarded during fermentation and storage in this new process.

(f) The fermentation can be carried out completely in one vessel.

(g) The yeast is healthier and need not be changed, from time to time as required in normal processes.

(h) Harsh flavours are eliminated from the beer.

(i) The process gives a beer with greater $CO_2$ retentive capacity than normal beers.

Broadly it may be said that the process steps carried out in the present invention are:

To mature and stabilise the wort before fermentation, to remove all chill sensitive material before fermentation (instead of after fermentation as in the present processes) and to stabilise head forming and flavour producing materials before fermentation, these three steps being all achieved by chilling the wort and holding it at preferably ½ degree F. above its freezing point until the wort has substantially stabilised, then removing all matter not in solution at this temperature, and then reheating to seeding temperature, this resulting in a greatly enhanced flavour, head retention and keeping quality of the finished beer.

The invention will now be described by way of example with reference to the accompanying diagrammatic drawing in which:

Figure 1 is a diagram of an apparatus for producing the beer when the wort is brewed at the specific gravity at which it is fermented, and Figure 2 is a similar diagram showing a modified form of apparatus used when it is economically possible to boil a higher gravity wort than is required for producing the finished beer.

In the arrangement of apparatus as shown in Fig. 1, the lower part of a hop strainer 1 is connected by a pipe 2 to the inlet of a wort pump 3, the outlet of which is connected by a pipe 4 to the wort inlet connection of a heat exchanger 5, the wort outlet connection of this heat exchanger 5 being connected by a pipe 6 to the wort inlet connection of a heat exchanger 7 the wort outlet connection of which is connected by a pipe 8 to the wort inlet connection of a heat exchanger 9.

The wort outlet connection of this heat exchanger 9 is connected by a pipe 10 through an inlet isolating valve 11 to a wort stabilising tank 12, this being connected to an outlet pipe 13 through an outlet isolating valve 14 through a pipe 15 to the inlet of a wort pump 16.

It will be understood that there will be (as shown in the drawing) a multiplicity of these wort stabilising tanks 12 connected at their inlets to the pipe 10 through inlet isolating valves 11 and also connected at their outlets through outlet isolating valves 14 to the pipe 15, each wort stabilising tank 12 being intended to hold one brew from the brewhouse and the number of these tanks 12 determined by the number of brews made per day and the time required for stabilising the particular brew being treated.

The outlet of the wort pump 16 is connected through a pipe 17 to the inlet of a clarifier or filter 18, the outlet of this apparatus being connected through a pipe 19 to the wort inlet of a heat exchanger 20.

Instead of the clarifier or filter 18, a special centrifuge of known type which will not heat up the wort could be used.

The wort outlet connection of the heat exchanger 20 is connected by a pipe 21 to the filling point of a fermenting vessel 22, the lower part of such vessel being connected by a pipe 23 to the inlet of a beer circulating pump 24, the outlet of such pump being connected to the beer inlet of a heat exchanger 25 which at its outlet is connected by a pipe 26 to a beer distributing pipe 27.

The inlet of the water section of the heat exchanger 20 is connected to a water supply by a pipe 28 and the outlet of the water section of this heat exchanger 20 is connected by a pipe 29 to a cooled water holding tank 30, the lower part of the latter being connected by a pipe 31 to a pump 32 and the delivery of the latter through pipe 33 to the water inlet of a heat exchanger 7.

The outlet of the water section of the heat exchanger 7 can be connected by a pipe 34 to the brewery washing water reticulation, if so desired.

The arrangement of apparatus as shown in Fig. 2 differs from that shown in Fig. 1 by the omission of the heat exchangers 7 and 20, cooled water holding tank 30 and the water pump 32, but apart from these omissions the connections between the hop strainer 1 and the fermenting vessel 22 are as described for Fig. 1.

The equipment shown in Fig. 2 which is not shown in Fig. 1 is a water holding vessel 35 the lower portion of which is connected by a pipe 36 to the water inlet of a heat exchanger 37, the water outlet of which is connected by a pipe 38 to a throttling valve 39, the outlet of which is connected by a pipe 40 to a mixer 41 placed at the junction of the pipes 19 and 21.

In the apparatus described in respect of Figs. 1 and 2, the heat exchangers 5, 7, 20 and 37 are of plate or tube type, while the heat exchangers 9 and 25 are of type using cooled brine or a refrigerant as the cooling medium, the wort stabilising vessel 12 and the filter 18 being held in a refrigerated insulated room, the fermenting vessel 22 being of such capacity as will be capable of holding the entire production per day of the brewhouse.

The arrangements of apparatus as shown in both Figs. 1 and 2 of the drawings may each be modified by the removal of the hop strainer 1 as the first unit of apparatus through which the wort has to pass on being received from the brewhouse and placing strainer means such as the strainer 1 on the pipe 17 between the wort pump 16 and the clarifier or filter 18, whereby hop straining is effected just prior to passage of the wort through said clarifier or filter 18.

In the preferred process described by way of example and with reference to Fig. 1 of the drawing, a specially adjusted boiling wort to give optimum coagulation when cooled to a temperature just above its freezing point is brought from the brewhouse into the hop strainer 1 which strains out the hops, leaving the wort and all amorphous matter to pass through the pipe 2 and the pump 3 by which it is forced through the various heat exchangers 5, 7 and 9 and their inter-connecting wort pipes into a selected wort stabilising vessel 12, the said heat exchangers 5, 7 and 9 having progressively reduced the temperature of the wort from boiling to preferably within half of a degree Fahrenheit of the freezing point of the wort.

The wort remains in this stabilising vessel 12 until all of the matter it is desired to remove comes out of solution, it being then run out through pipes 13 and 15 to the inlet of a wort pump 16 by which it is forced through the pipe 17 and through the clarifier or filter 18 which removes all matter not in solution at this temperature of half of a degree Fahrenheit above the freezing point of the wort.

To prevent any rise in the temperature of the wort between the wort stabilising tank 12 and the outlet of the clarifier or filter 18, the wort stabilising tanks 12, pump 16 and the clarifier or filter 18 are preferably housed in a refrigerated room.

The now filtered wort flows through the pipe 19 into the heat exchanger 20 where it is warmed to the desired temperature for the start of fermentation and from this heat exchanger 20 the wort flows through the pipe 21 into the fermenting vessel 22 where the yeast is added.

To control the heat of fermentation, the beer is circulated from the lower part of the fermenting vessel 22 through pipe 23 to the inlet of the beer circulating pump 24 by which it is forced through the beer section of the heat exchanger 25 through the pipe 26 and the distributing pipe 27 back into the fermenting vessel 22, or if so desired, in the usual known manner using attemperating pipes etc.

In the heat exchanger 20 heat is transferred from the water to the wort to give the necessary rise in wort temperature, this transfer of heat reducing the temperature of water which is then passed through the pipe 29 into the holding tanks 30, while the wort temperature is controlled by varying the volume of water passing through the heat exchanger 20.

From the holding tank 30 the water flows through the pipe 31 to the inlet of the pump 32 by which it is forced through pipe 33 and the water section of the heat exchanger 7 back to the brewery washing water reticulation through the pipe 34.

The wort may be warmed up directly by steam or hot water where it is not necessary for purposes of economy in refrigeration to adopt the regenerative cooling system herein described.

In the modified process using the system of apparatus as shown in Fig. 2 the boiling wort is prepared in the brew house at a higher gravity than is required for producing the finished beer, the wort then flowing from the outlet of the hop strainer 1 through the system to the outlet of the clarifier or filter 18 in the manner as has been described with reference to Fig. 1, except in that the omitted items of equipment are not included in the circuit, and from the outlet of the said clarifier or filter 18 the wort flows through the pipe 19 to the mixer 41.

At this point the wort is mixed with water which flows into the mixer 41 from the pipe 40 through the throttling valve 39 connected to pipe 38 which is connected to the diluting water outlet of the heat exchanger 37 which is fed through the pipe 36 from the water holding vessel 35, the throttling valve 39 enabling the flow of water to be controlled so that the specific gravity of the mixture at the outlet of the mixer 41 can be regulated to the specific gravity desired for the particular beer being produced.

The temperature of the wort at the outlet of the mixer 41 can also be controlled to the desired starting temperature of fermentation by regulating the flow of the heating or cooling medium used in the heat exchanger 37 to effect the necessary variation in the diluting water temperature.

From the outlet of the mixer 41 the wort flows through the pipe 21 to the fermenting vessel 22.

Yeast is now added and the heat of fermentation removed as previously described in respect of the apparatus of Fig. 1 of the drawing.

In modified processes using the modified arrangements of apparatus in which the position of the hop strainer 1 is changed in respect of both Fig. 1 and Fig. 2 of the drawing, so that said hop strainer 1 is placed on the pipe 17 between the wort pump 16 and the clarifier or filter 18, the processes are the same as described, except, in that the boiling wort from the brewhouse containing the hops (which are preferably shredded) remain in the wort right through the cooling process into the stabilising tanks 12 and the hops are removed from the wort by the strainer 1 on the pipe 17 just prior to said wort passing to the clarifier or filter 18, this latter removing all matter not in solution which has passed through the strainer 1.

While it has been found that best results are obtained by chilling the wort and holding same until it has substantially stabilised at a temperature of ½ degree F. above its freezing point, such temperature may be varied to some small extent by being reduced to slightly less than ½ degree F. or increased to about 2 degrees F. above its freezing point.

In actual fact it has been found that by chilling the wort to below its freezing temperature and then to melt same and effect removal of all matter not in solution at a temperature of ½ degree F. above its freezing temperature produces better results than are obtained by the methods as have been described herein, but against such improvements obtained by actual freezing of the wort there are economic commercial considerations, in that freezing of the wort adds appreciably to refrigeration costs and also adds cost in respect of heating required to melt the frozen wort and so the methods described in which the wort is chilled to just short of its freezing temperature are preferred.

In the following there is set forth what is believed to take place while the wort is being held until stabilized.

The cooling of the wort from boiling to below fermenting temperature brings about a considerable disturbance in the colloidal equilibrium of the wort. This causes head and flavor forming material normally soluble to come out of solution and become unfilterable. This material, made unfilterable, would not previously be in "ionic solution" such as amino acids, but would be dissolved in a colloidal state where the protein material, while being in micellar form, is filterable, and the wort in which it is dissolved is brilliantly clear.

Other material which causes cloudiness and unwanted flavors in the finished beer also comes out of solution. By holding the wort without further temperature change for a varying period this unwanted material continues to coagulate until it becomes removable by filtration. At the same time the head and flavor forming materials which are normally soluble, but which have become insoluble, slowly "redissolve to a colloidal solution and so completes stabilizaton." The wort is then filtered removing all the unwanted material and allowing the head and flavor forming material to remain in the wort which is then heated up to the start of fermentation temperature and the yeast added.

In this explanation of what is meant by stabilization, the word "stabilization" should be interpreted to cover the various phenomena taking place in the stabilizing tanks 12, Figs. 1 and 2.

All that is known both factual and theoretical is explained, but what happens as a result of the various phenomena occurring during stabilization, is that beer made by this process has a greatly enhanced head, body and flavor.

It must also be understood that the various phenomena which occur in the stabilizing tank are only a preparatory conditioning of the wort so that stabilization is complementary to a later process of fermentation, and that the benefits resulting from stabilization are the results of preparing the wort so that after fermentation these benefits become apparent.

In the foregoing reference has been made to "substantially stabilized" and thus the word "substantially" has been used because perfect stabilization according to all present day knowledge is not possible.

I claim:

1. In the manufacture of beer and fermented beverages, the improved process for treating wort comprising cooling the wort from boiling to a temperature below freezing and not more than approximately 2° F. above freezing which is below that required for the start of fermentation and holding it at said temperature for a period of time until the materials inducing foam, body and flavor in the finished beer which have come out of solution during cooling and which are capable of redissolving have redissolved and the materials not soluble at said temperature have coagulated, removing from the wort all insoluble material at said temperature to stabilize the wort, and finally reheating the stabilized wort to the seeding temperature of fermentation and fermenting the wort.

2. In the manufacture of beer and fermented beverages according to claim 1, in which the wort is held at the first-named temperature for at least six hours.

3. In the manufacture of beer and fermented beverages according to claim 1, in which at the beginning the wort is of a higher specific gravity than that which is desired at the beginning of fermentation, and in which the wort is diluted with water after stabilization and the removal of the undesired separated solid components until the desired specific gravity is attained, and heating the diluted wort to the desired start of fermentation temperature.

4. In the manufacture of beer and fermented beverages according to claim 1, in which the temperature to which the hot wort is cooled and held is ½° F. above the freezing point of the wort.

5. In the manufacture of beer and fermented beverages according to claim 1, in which the wort is cooled down to below its freezing point and the wort is thereupon thawed and is held at a temperature ½° F. above the freezing point of the wort.

6. In the manufacture of beer and fermented beverages, the improved process for treating wort comprising cooling the wort from boiling to a temperature at approximately the freezing temperature holding it at said temperature for a period of time until the materials inducing foam, body and flavor in the finished beer which have come out of solution during cooling and which are capable of redissolving have redissolved and the materials not soluble at said temperature have coagulated, removing from the wort all insoluble material at said temperature to stabilize the wort, and finally reheating the stabilized wort to the seeding temperature of fermentation and fermenting the wort.

References Cited in the file of this patent

UNITED STATES PATENTS

| 841,126 | Deckebach | Jan. 15, 1907 |
|---|---|---|
| 1,117,613 | Wahl | Nov. 17, 1914 |
| 1,181,770 | Just | May 2, 1916 |
| 1,338,803 | Wilhelmy | May 4, 1920 |
| 1,487,842 | Dolenz | Mar. 25, 1924 |
| 1,673,274 | Wallerstein | June 12, 1928 |

OTHER REFERENCES

American Handy Book; cited, pages 1159, 1160, 1161.

American Handy Book of the Brewing, Malting and Auxiliary Trades, by R. Wahl & M. Henius, third edition, vol. 2, by Wahl-Henius Institute, 1908, pages 1233, 1427 to 1429.